(12) United States Patent
Ootsu et al.

(10) Patent No.: US 7,261,827 B2
(45) Date of Patent: Aug. 28, 2007

(54) METHOD OF PROCESSING END PORTIONS OF OPTICAL FIBERS AND OPTICAL FIBERS HAVING THEIR END PORTIONS PROCESSED

(75) Inventors: Kenji Ootsu, Tokyo (JP); Keiji Murakami, Tokyo (JP); Tomishige Tai, Tokyo (JP)

(73) Assignee: Japan Aviation Electronics Industry Limited, Tokyo (JP)

( * ) Notice: Subject to any disclaimer, the term of this patent is extended or adjusted under 35 U.S.C. 154(b) by 468 days.

(21) Appl. No.: 10/816,622

(22) Filed: Apr. 2, 2004

(65) Prior Publication Data

US 2004/0228591 A1  Nov. 18, 2004

Related U.S. Application Data

(62) Division of application No. 10/407,371, filed on Apr. 4, 2003, now abandoned, which is a division of application No. 09/800,033, filed on Mar. 6, 2001, now abandoned.

(30) Foreign Application Priority Data

Dec. 27, 2000  (JP) ............................. 2000-398342

(51) Int. Cl.
C23C 25/68  (2006.01)
(52) U.S. Cl. .............. 216/7; 216/11; 216/24; 216/96
(58) Field of Classification Search ............. 216/7, 216/11, 24, 96
See application file for complete search history.

(56) References Cited

U.S. PATENT DOCUMENTS

| | | | |
|---|---|---|---|
| 4,265,699 A | | 5/1981 | Ladany |
| 4,469,554 A | * | 9/1984 | Turner .......................... 216/97 |
| 5,395,741 A | * | 3/1995 | Marchman ................... 430/320 |
| 5,480,049 A | * | 1/1996 | Marchman ..................... 216/24 |
| 5,566,262 A | * | 10/1996 | Yamane et al. ................ 385/33 |

(Continued)

FOREIGN PATENT DOCUMENTS

JP  H07-151769  6/1995

(Continued)

OTHER PUBLICATIONS

"Surface Tension" in http://hyperphysics.phy-astr.gsu.edu/Hbase/surten.html.*

(Continued)

*Primary Examiner*—Nadine G. Norton
*Assistant Examiner*—Binh X. Tran
(74) *Attorney, Agent, or Firm*—David N. Lathrop, Esq.; Larry Mendenhall, Esq.; Gallagher & Lathrop

(57) ABSTRACT

An end portion of an optical fiber element 11 is dipped into an etchant to shape that portion of the fiber element immersed in said etchant into a coaxial reduced-diameter portion by etching while causing that portion of the fiber element where the etchant rising to a certain height above the level surface of the etchant due to surface tension into a conical tapered surface portion which is formed between the reduced-diameter portion and un-etched portion of the fiber element, and subsequently thereafter, the reduced-diameter portion is cut to have a very short length thereof remained.

34 Claims, 15 Drawing Sheets

U.S. PATENT DOCUMENTS 5,812,724 A    9/1998   Ohtsu et al.
5,908,562 A    6/1999   Ohtsu et al.
5,985,166 A   11/1999   Unger et al.
6,303,041 B1 * 10/2001  Laming et al. ............... 216/24

FOREIGN PATENT DOCUMENTS

| | | |
|---|---|---|
| JP | H07-209308 | 8/1995 |
| JP | 07-260459 | 10/1995 |
| JP | H07-270631 | 10/1995 |
| JP | H09-304632 | 11/1997 |
| JP | H11-504123 | 4/1999 |

OTHER PUBLICATIONS

"Surface Tension" in Wikipedia. http://en.wikipedia.org/wiki/Surface_tension.*

* cited by examiner

METHOD OF PROCESSING END PORTIONS OF OPTICAL FIBERS AND OPTICAL FIBERS HAVING THEIR END PORTIONS PROCESSED

CROSS REFERENCE TO RELATED APPLICATIONS

This application is a divisional of U.S. application Ser. No. 10/407,371 filed on Apr. 4, 2003, now abandoned, which is a divisional of U.S. application Ser. No. 09/800,033 filed on Mar. 6, 2001, now abandoned.

BACKGROUND OF THE INVENTION

1. Field of the Invention

This invention relates to a method of processing end portions of optical fibers utilized in, for example, optical communications, and more particularly to a method of processing end portions of optical fiber elements which elements are well suitable for end-to-end connecting together and also relates to such optical fibers having end portions specifically processed.

2. Description of the Related Art

FIGS. 19 and 20 show the configuration of the end portion of an optical fiber to be connected to a conventional optical connector. In the drawings, the reference numeral 10 indicates the optical fiber and 20 the ferrule bonded to the end portion of the optical fiber 10. The ferrule 20 is of a hollow cylindrical shape and has a through-bore 21 formed through its center axis for receiving an optical fiber element 11 which is a bare fiber exposed by removing away a protective coating therefrom. The fiber element 11 is inserted into the through-bore 21 and fixed or adhered thereto by adhesive 20A.

In a conventional optical connector, the end terminal face of the ferrule 20 having an optical fiber element 11 adhesively fixed thereto is ground to a convex spherical shape, and a pair of such identical ferrules 20 thus shaped are then brought into end-to-end abutment and joined together within a split sleeve 30 (see FIG. 21). For this process, the PC (Physical Contact) joining method is used which involves applying urging pressure to the end faces of the pair ferrules 20 by resilient springs (not shown) to elastically deform the core of the respective optical fiber elements 11 of the optical fibers 10 lying at the apices of the convex spherical ends. With this PC joining method, no air space is produced between the optical fiber elements 11, allowing for the joining at a low transmission loss.

Currently, however, optical connectors configured so as to connect optical fiber elements 11 directly together without the use of the ferrules 20 have been designed in view of the demand for more compactness and finer pitches of optical connectors. But, the optical connector of such configuration still requires the PC joining method in order to accomplish the purpose of reducing the loss. Further, the urging pressure for effecting the PC joining in this type of optical connector is characterized in that it is generated by axially compression-deforming the optical fiber elements 11 and utilizing the restoring force (which will be hereinafter referred to as buckling load) from the compressive deformation.

In this regard, the magnitude of the buckling load generated by compression-deforming the optical fiber elements 11 is on the order of 0.2-0.4N. Depending on the condition of the end face of the optical fiber, particularly if the end face has been cut at an angle θ which is not a right angle with respect to the fiber axis as illustrated in FIG. 22A, even a buckling load TH exerted on such fiber as shown in FIG. 22B may fail to sufficiently compression-deform the opposed cores, resulting in occurrence of a gap G between the opposed fiber ends as shown in FIG. 22C and hence inability to accomplish the PC connection. Consequently, it is undesirably difficult to achieve stable optical properties.

One approach currently proposed to solve this difficulty is to form the end portion of an optical fiber in a shape of a convergent taper by using the technique as disclosed in the Japanese Patent Publication Kokoku 3-50246, and then cut the tapered end to obtain a flat end face, thereby to optically couple a pair of the thus obtained optical fibers together by butt-joining the flat end faces.

This method allows for facilitating the deformation of the opposed fibers at their extreme cut ends to secure good optical coupling result even if the end faces are cut more or less at an angle θ, because the end faces to be abutted together are reduced in area due to the convergent taper.

Nevertheless, the thus obtained optical fiber elements 11 have a drawback that the optical fiber elements 11 are vulnerable to failure due to their reduced mechanical strength when they are subjected to the connecting method as mentioned above by abutting them against each other and subjecting them to buckling load.

In order to overcome this drawback, there was an approach toward providing the peripheral surface of the optical fiber element 11 with a coating film 11C of carbon, resinous material or the like as illustrated in FIG. 23.

However, when an attempt is made to form a taper end portion at its terminal end of such optical fiber element 11 covered with the coating film 11C, by using the etching technique in accordance with the method as disclosed in the Japanese Patent Publication Kokoku 3-50246, the etching process would start with the end face of the optical fiber element 11 which is only the portion exposed from the coating film 11C with the peripheral surface of the cladding 11B of the optical fiber element 11 being covered with the coating film 11C, so that the etching would proceed from the core 11A located in the center of the fiber element 11, with the result that the optical fiber element 11 would be etched in a generally cylindrical form, and thus end in failure to form tapered surface portions.

For this reason, the present inventors endeavored to solve this drawback in the technique of forming a taper on an optical fiber element 11 coated with a coating film 11C, and conceived such a technique as to deposit a resist film 13 on the end terminal surface of the optical fiber element so as to cover the entire end face of the core 11A and the radially inner half part of the cylindrical end face of the clad 11B as shown in FIG. 24 prior to effecting the etching process and then dipping the end portion of the fiber element thus covered with the resist film 13 into an etching solution J as shown in FIG. 25.

According to this endeavored method, since the end face of the core 11A is fully protected from the etching by the resist film 13, it was found that the immersed end portion of the fiber element is formed with a reduced-diameter portion 14 extending upward from its extreme end.

It was also found that the fiber element was provided with a tapered surface portion TP at the upper part of the reduced-diameter portion, that is, a part of the fiber element corresponding to ultimately at an elevated portion from the liquid level of the etchant J.

After a desired tapered surface portion TP has been obtained, those portions of the coating film 11C corresponding to the reduced-diameter portion 14 and the tapered surface portion TP are removed.

However, this endeavored method still has the disadvantage that it requires an additional step of applying a resist film 13 to the end face of an optical fiber element 11 prior to forming a tapered surface portion thereon, and also another additional step of removing the coating film. It makes thus the manufacturing process correspondingly cumbersome. Particularly in the case of an optical fiber having a multiplicity of optical fiber elements 11 integrally incorporated therein such as the flat tape type optical fiber, the operation of depositing a resist film 13 to the end face of each individual optical fiber element 11 has proved too cumbersome to put this method into practical use.

Turning now back to the prior art of Japanese Patent Publication Kokoku 3-50246, when the optical fiber element is cut directly on the tapered surface portion as disclosed this prior art, the cutter edge may slip axially along the angular tapered surface portion to exert an axial force on the fiber element during the cutting process. Consequently, this method has another drawback that flaws such as cracks may possibly occur in the cut portions.

In addition, in order to form tapered surface portions on the individual fiber elements 11 of a tape type optical fiber array 10T comprising a plurality of optical fiber elements 11 held by a tape-like sport 12T as illustrated in FIG. 26, the Japanese Patent Publication Kokoku 3-50246 also discloses a method involving dipping the individual fiber elements 11 in an etchant J. As one example, it is disclosed that even if the fiber elements immersed in the liquid are not equal in length, a plurality of tapered surface portions which are shaped in conical terminal ends are uniformly formed in their lengths, since those portions of the fiber elements immersed in the liquid should be completely dissolved by dipping them for a sufficiently longer period of time (such as, 30-60 minutes) which is enough for the complete dissolve.

The present inventors have discovered, however, when the above-identified prior art technique were applied to a tape type optical fiber array 10T comprising a multiplicity of individual fiber elements 11 having as fine an array pitch PN as around 0.25 mm so as to accomplish the purpose of the present invention, a specific phenomenon occurred that the levels of the respective liquid heads of the etchant which heads are adhering to the respective associated fiber elements, could rise higher as it is closer to the middle of the array due to the surface tensions acting on the respective liquid heads adhering to individual fiber elements 11 overlapping to each other (see FIG. 27).

As a result, the troubles occur that the axial dimension (length) L of the tapered surface portion TP formed by etching gets successively longer in the order of $L1<L2<L3<L4$ toward the middle of the array of the fiber elements 11 and that the positions of the tapered surface portions are displaced with respect to each other. Especially, the axial dimensions $L1<L2<L3<L4$ of the tapered surface portions TP tend to be longer than that obtained when the etching is conducted on a single fiber.

By way of example, if the array pitch PN of the fiber elements 11 is 0.25 mm and the diameter of the fiber elements 11 is 0.125 mm (125 μm), the axial dimensions $L1<L2<L3<L4$ of the tapered surface portions TP will be around 0.3 to 0.5 mm. On the other hand, when the etching is conducted on a single fiber, the axial dimension of the tapered surface portion TP will be around 0.1 mm. This means that the axial dimension L of the tapered surface portion TP formed on the multiple-fiber type optical fiber array will be about 3 to 5 times as long as that of the single-core fiber.

As the axial dimension L of the tapered surface portion TP increases, the strength of the tapered surface portion TP adjacent its forward end correspondingly decreases. With repeated connecting operations of optical connectors, fatigue is built up in the tapered surface portion TP, causing a durability problem.

As discussed above, the conventional methods and the prior attempt conducted by the present inventors are still insufficient due to various problems. Accordingly, there has been a need for obtaining an effective and practical method for processing end portions of optical fibers as well as optical fiber having an improved end portion which is applicable to the repeated connection purpose.

SUMMARY OF THE INVENTION

A first object of this invention is to provide an optical fiber element having a tapered surface portion adjacent to its end and a reduced-diameter end portion extending forwardly from the tapered surface portion and also to provide an optical fiber end portion processing method for forming a tapered surface portion having a reduced-diameter end portion extending forwardly therefrom.

This reduced-diameter end portion extended from the tapered surface portion is adapted to be butt-joined to the identical reduced-diameter end portion of another identical opponent optical fiber element.

A second object of this invention is to provide an optical fiber end portion processing method capable of forming a tapered surface portion having a reduced-diameter end portion extending therefrom on an coated optical fiber element as well by simple steps.

A third object of this invention is to provide an optical fiber end portion processing method capable of forming tapered surface portions with reduced-diameter end portions on a plurality of parallel juxtaposed optical fiber elements forming an optical fiber array therewith. These tapered surface portions of the respective optical fiber elements have approximately equal reduced axial dimensions or lengths which are also same as that obtained by etching of a single optical fiber element, to thereby provide the tapered surface portion with an enhanced durability.

In order to accomplish the first object, this invention provides an optical fiber end portion processing method wherein: an optical fiber element having a core in the axial center thereof and a cylindrically formed clad surrounding the periphery of the core is dipped at an end portion thereof into an etchant while holding the element in an attitude substantially perpendicular to the surface of the etchant; the portion of the fiber element dipped below the liquid level of the etchant is shaped into a reduced-diameter portion by etching in the etchant while the portion of the etchant is caused to rise along outer periphery of the clad of the fiber element to a certain height M (see FIG. 1) above the liquid level of the etchant due to surface tension to thereby shape the portion of the fiber element contacted by said rising portion of the etchant into a tapered surface portion extending from the reduced-diameter portion up to the outer diameter of the non-etched portion of the clad; the period of time for the etching process is specially controlled so that the etching process is terminated whenever a desired tapered surface portion is obtained, at the moment of termination of the etching process, the reduced-diameter portion 14 of a desired diameter which is slightly larger than that of the core is formed in conjunction with the tapered surface portion; and then the reduced-diameter portion 14 is cut at a point spaced by a very short distance from the boundary between the tapered surface portion and the reduced-diameter portion toward the reduced-diameter portion so as to leave a reduced-diameter end portion 14T continuously joining to the tapered surface portion.

The reduced-diameter end portion has to have axial length m which is desired not to exceed to its own diameter.

In order to accomplish the second object, this invention provides an optical fiber end portion processing method wherein: an optical fiber element having a core in the axial center thereof, a cylindrically formed clad surrounding the periphery of the core and a coating film formed around the peripheral surface of the clad is shaped to have a residual coating film in a certain distance from the extreme end of the optical fiber element and a coating film-removed section of a certain length A (see FIG. 3) from which the coating film is removed in a position adjacent to the residual coating; the thus shaped optical fiber element at the entire part of the residual coating thereof and at about half of the coating film-removed section thereof is dipped into an etchant while holding the fiber element with its axis in an attitude substantially perpendicular to the surface of the etchant in such a manner that the top half part of the coating film-removed section is positioned upwardly away from the liquid level of the etchant; shaping that the lower half part of the exposed clad at the coating film-removed section of the fiber element immersed in the etchant is shaped into a reduced-diameter portion by etching in the etchant while the portion of the etchant is caused to rise along outer periphery of the clad of the fiber element to a certain height M above the liquid level of the etchant due to surface tension to shape the outer periphery of the clad in a length of M above the liquid level contacted by said rising portion of the etchant into a tapered surface portion extending from the reduced-diameter portion up to the outer diameter of the non-etched portion of the clad; the etching process is terminated whenever a desired tapered surface portion together with a desired reduced-diameter portion 14 is obtained; and then the reduced-diameter portion 14 is cut at a point spaced by a very short distance from the boundary between the tapered surface portion and the reduced-diameter portion toward the reduced-diameter portion so as to leave a reduced-diameter end portion 14T continuously joining to the tapered surface portion, the reduced-diameter end portion having a very short length corresponding to the very short distance.

In order to accomplish the third object, this invention provides an optical fiber end portion processing method wherein a level controlling means for restraining the liquid level of the etchant is provided upward from the liquid level in such a manner that the lower end thereof contacts to the liquid surface of the etchant whereby the axial dimension of the tapered surface portion formed on the optical fiber element is controlled at a desired value.

This invention also provides the optical fiber end portion processing method wherein the level controlling means is constituted by an etching-resistant film formed around the peripheral surface of the optical fiber element.

This invention further provides the optical fiber end portion processing method wherein the level controlling means is constituted by a coating film applied to the optical fiber element.

This invention further provides the optical fiber end portion processing method wherein the level controlling means comprises a flat plate made of etching-resistant material with through-apertures formed through the flat plate perpendicularly to the plane of the flat plate, each of the through-apertures having a diameter slightly larger than the outer diameter of the corresponding optical fiber element.

This invention further provides the optical fiber end portion processing method wherein a liquid having a specific gravity lower than that of the etchant is added to the etchant.

This invention further provides the optical fiber end portion processing method wherein a plurality of optical fiber elements are held in parallel to each other to form a fiber array therewith by using a single common covering or supporting member.

Still further, this invention provides an optical fiber comprising an optical fiber element having a tapered surface portion formed adjacent to its end part with a reduced-diameter end portion 14T formed integrally with the forward end of the tapered surface portion.

DETAILED DESCRIPTION OF THE INVENTION

Various embodiments of this invention will now be described with reference to the accompanying drawings. Like numerals and characters indicate like elements throughout the various drawings.

First Embodiment

Figure 1:
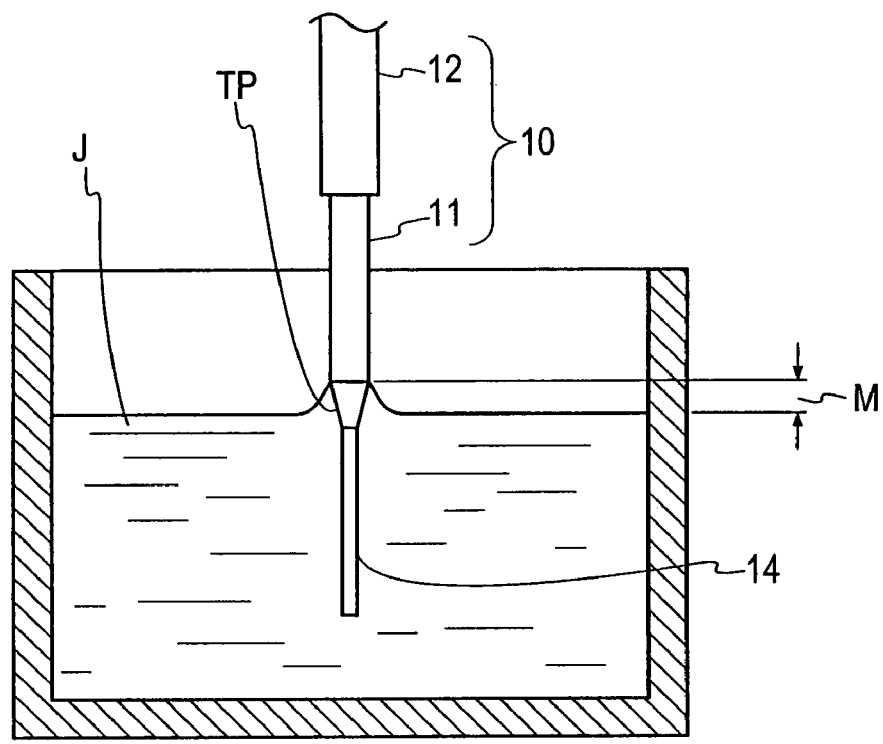
FIG. 1 is a cross-sectional view illustrating a first embodiment of the optical fiber end portion processing method according to this invention.
Figure 23:
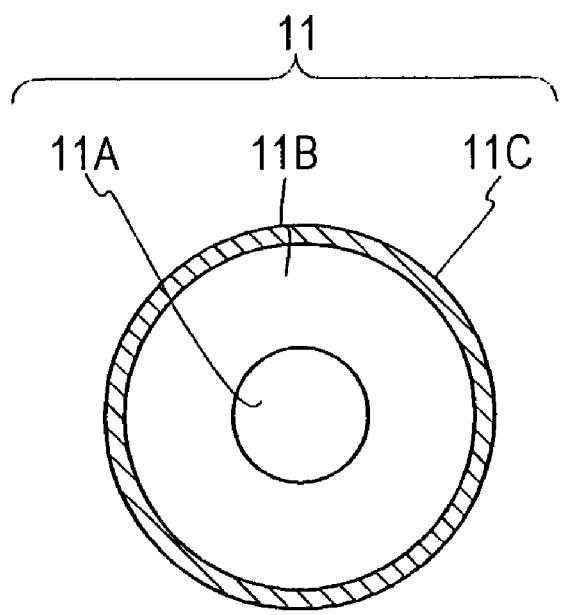
FIG. 23 is a front view illustrating the construction of an optical fiber element provided with a coating film.

Referring to FIGS. 1, there is shown a first embodiment of the optical fiber end portion processing method according to this invention. The embodiment illustrated in FIGS. 1 is directed to forming a tapered surface portion TP on an optical fiber element 11 having no coating film 11C coated around the clad 11B (see FIG. 23). In this case, the clad of an optical fiber element 11 is exposed from a covering 12 and is dipped into an etchant J such as hydrogen fluoride, for example.

The length of the immersed portion of the optical fiber element 11 (submerged below the liquid level) should be long enough as compared to the diameter of the optical fiber element 11. By way of example, for the optical fiber element 11 having a diameter of 0.125 mm with a core having a diameter of slightly shorter than 0.05 mm, the immersed length may be about 12.5 mm which is one hundred times the diameter.

The optical fiber element 11 is dipped into an etchant J while holding the element in an attitude substantially perpendicular to the liquid surface of the etchant J. If necessary, any suitable holding means or member (not shown) for supporting the fiber element in its appropriate state may be utilized. Around the peripheral surface of that portion of the optical fiber element 11 contacted by the liquid surface, the etchant J rises in the form of a taper over a distance M due to the surface tension and attaches to the peripheral surface of the optical fiber element 11. By this raised etchant J attached to the peripheral surface, the portion of the fiber element extending the distance M from the liquid surface is etched to be formed into a tapered surface portion TP. The portion of the optical fiber element 11 extending below the tapered surface portion TP (the portion immersed in the liquid, lower as viewed in the drawing) is formed into a reduced-diameter portion 14 which has been reduced in diameter generally constantly along the length thereof. It is thus to be understood that the tapered surface portion TP is formed as a result of the diameter varying gradually from the diameter of the reduced-diameter portion 14 up to the outer diameter of the clad 11B.

At the time when the diameter of the reduced-diameter portion 14 has reached a target value, say 50 μm, which is determined by the time lapsed after the initiation of the etching process, and which is selected to be slightly larger than the diameter of core, the etching is terminated.

In this regard, the Japanese Patent Publication Kokoku 3-50246 discloses nothing about terminating the etching process in a halfway. In other words, it merely discloses that the etching process is continued until the reduced-diameter portion has been completely etched out so as to obtain a conical shaped end portion.

The present invention is specifically characterized by controlling the length of time period for carrying the etching process, which is different from the above-identified prior art.

Figure 2:
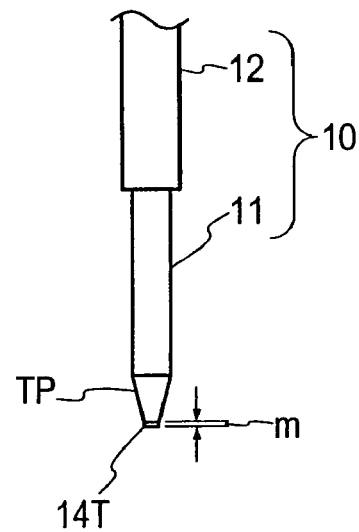
FIG. 2 is a side view illustrating the construction of the forward end portion of the optical fiber element obtained by the embodiment shown in FIG. 1.

Subsequently, the reduced-diameter end portion 14 is severed. More specifically, according to this invention, the cutting is made perpendicularly to the fiber axis at a point m spaced slightly, preferably 20 to 30 μm from the boundary between the tapered surface portion TP and the reduced-diameter portion 14 toward the reduced-diameter portion. (The 20 to 30 μm distance can be calculated as 40-60% of the 50 μm-diameter of the core or as 16-24% of the 125 μm diameter of the optical fiber element.) This leaves a reduced-diameter portion 14T with a length m integrally joining to the tapered surface portion TP (see FIG. 2).

The adoption of such cutting point allows for severing the optical fiber element 11 without the risk of producing any defects thereon.

If the optical fiber element having only the tapered surface portion as shown in the above-identified prior art is to be cut directly on the tapered surface portion TP, not only it would be difficult to cut it exactly at a desired position, but also the cutter edge would cut it with a force tending to slip the edge axially along the angular tapered surface portion. Due to such an axially acting force, some unevenness as well as flaws such as cracks may result on the cut surfaces.

In this connection, the Japanese Patent Publication Kokoku 3-50246 discloses the use of arc discharge device to cut a conical end portion of an optical fiber element since this optical fiber is applicable to connect to optical element. This prior art also evidently describes that the use of a cutter is impossible, in view of the fact that the optical fiber elements according to that patent are provided with conical pointed ends.

In contrast, according to this invention, since the reduced-diameter end portion 14 is cut at a selected point, there occurs no axial force exerted on the cutter edge during the cutting operation. As will be appreciated, this invention ensures stable cutting and provides for reducing the incidence of flaws on the surfaces.

Second Embodiment

Figure 3:
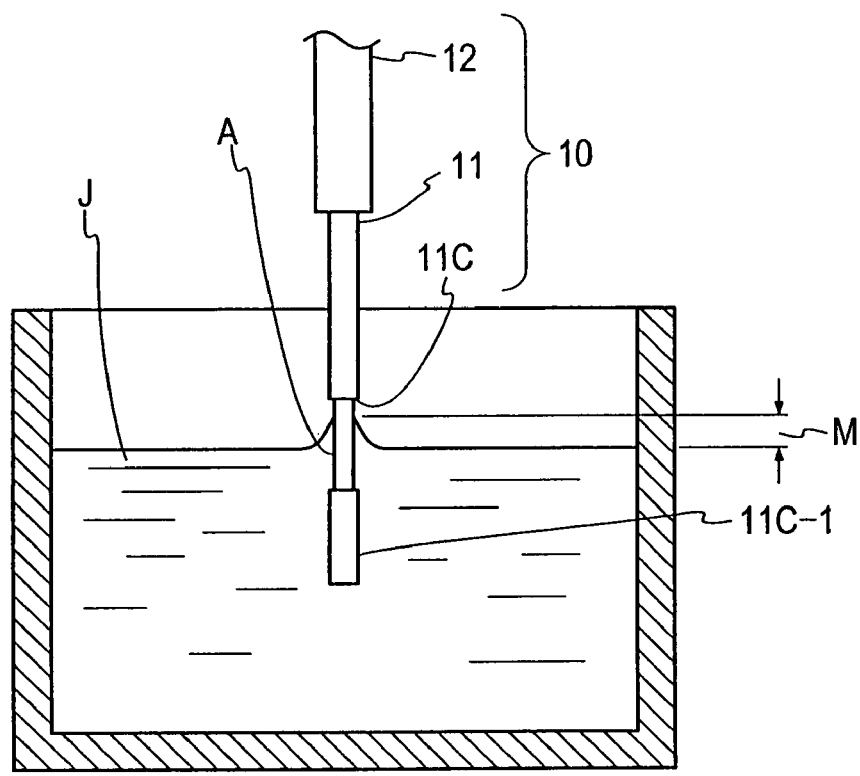
FIG. 3 is a cross-sectional view illustrating a second embodiment of the optical fiber end portion processing method according to this invention.

FIG. 3 illustrates a second embodiment directed to forming a tapered surface portion TP on an optical fiber element 11 which has a coating film covering the clad. In this instance, a coating film-removed section A is formed on an optical fiber element 11 at an arbitrary location away from the extreme end of the optical fiber element. The coating film 11C is generally made of carbon, resinous material or the like. Such coating film 11C may be removed by irradiating laser beam with a laser beam irradiation apparatus. The length of the coating film-removed section A may be arbitrarily chosen. As a guide, it may be longer than that of the tapered surface portion TP to be formed. This embodiment is characterized by leaving a residual coating film 11C-1 below the coating film-removed section A. With regard to the etching on the portion of the optical fiber element corresponding to the residual coating film 11C-1, it is to be understood that the etching will proceed in both directions, namely from the far end side of the residual coating film toward the coating film-removed section A and from the inner end side of the residual coating film toward the far end side of the residual coating film 11C-1.

On the side of the far end of the residual coating film 11C-1 the etching proceeds in a cylindrical manner from the core to the clad, whereas on the side of the coating film-removed section A of the residual coating film 11C-1 the etching proceeds in a sense to thin the clad layer.

The etching tending to thin the clad layer progresses downwardly as shown in FIG. 3 until it meets the cylindrical etching progressing upwardly from the far end of the residual coating film 11C-1, whereupon the diminished residual coating film 11C-1 is separated from the optical fiber element 11 and sinks in the etchant J.

When the etching initiated from the far end side which is to shape the optical fiber element 11 in a cylindrical form encounters the etching initiated from the coating film-removed section A side, the cylindrical portion formed on the far end side is rapidly extinguished, so that the optical fiber element will ultimately have a substantially flat lower end face remaining.

Figure 4:
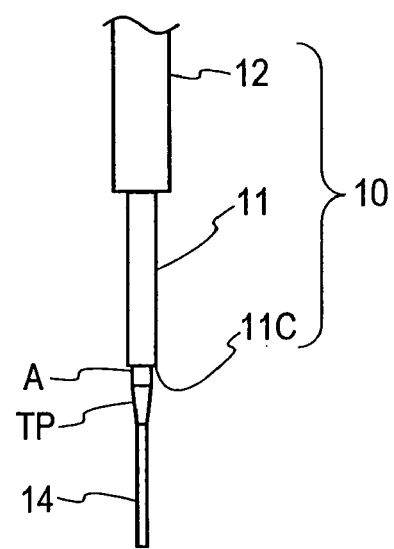
FIG. 4 is a side view illustrating the configuration of the optical fiber element obtained by the embodiment shown in FIG. 3.
Figure 5:
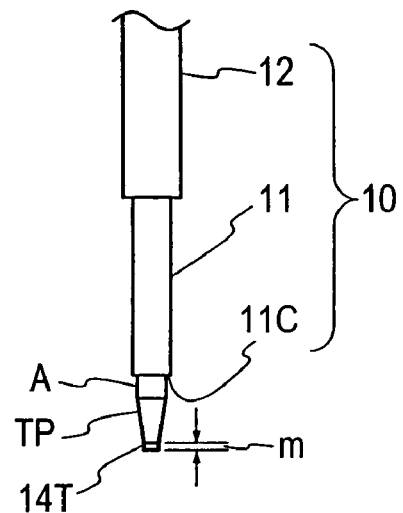
FIG. 5 is a side view illustrating the optical fiber element shown in FIG. 4 having the reduced-diameter end portion 14T of a length m after the rest of the reduced-diameter portion 14 has been removed.
Figure 24:
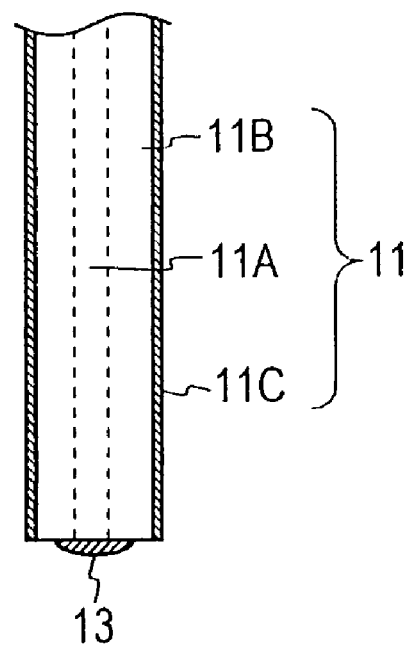
FIG. 24 is a cross-sectional view illustrating the pre-treatment technique developed by the present inventors so as to form a tapered surface portion on the optical fiber element provided with a coating film as shown in FIG. 23.
Figure 25:
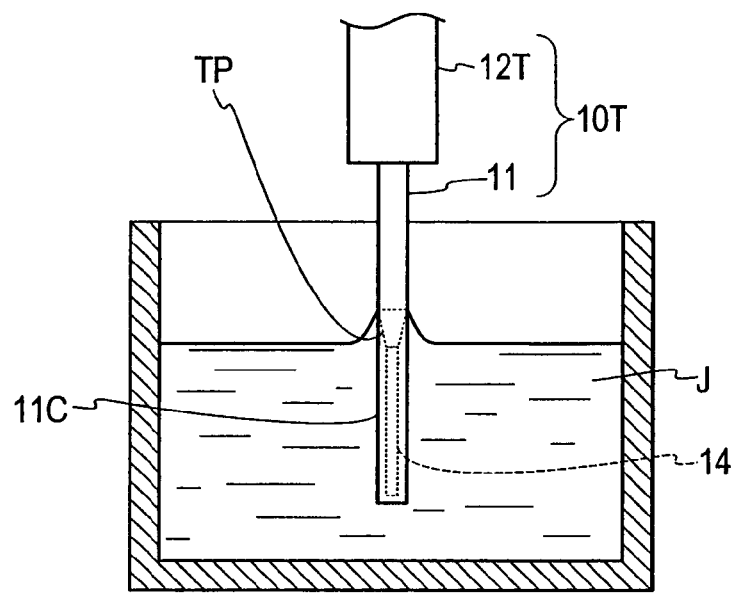
FIG. 25 is a cross-sectional view illustrating the etching technique developed by the present inventors so as to carry out this technique on the optical fiber element which has been subjected to the pre-treatment as illustrated in FIG. 24.
Figure 26:
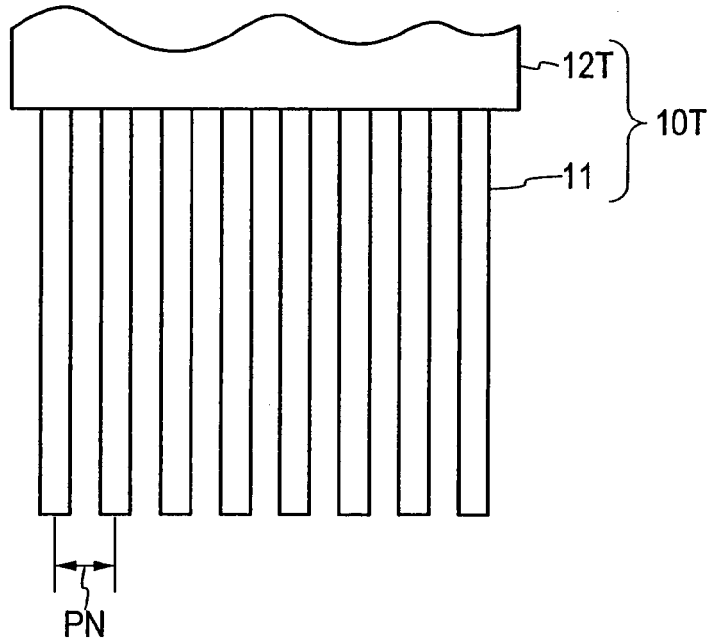
FIG. 26 is a side view illustrating the construction of a known tape-type optical fiber array.

As is appreciated from the forgoing, without the need for depositing a resist film 13 as described hereinbefore with reference to FIG. 24, the optical fiber element 11 is formed with a reduced-diameter end portion 14 which is similar to that obtained in the embodiment shown in FIG. 1 and which has an ultimately flat end face. In addition, on the top of the reduced-diameter end portion 14 a tapered surface portion TP is formed by the etchant J rising due to its surface tension, as shown in FIG. 4. Upon the time when the diameter of the reduced-diameter portion 14 has reached a predetermined value being determined, the etching is terminated. After the termination of the etching, the optical fiber element 11 is cut so as to leave a short reduced-diameter end portion 14T, whereby an optical fiber 10 having a tapered surface portion TP formed with the reduced-diameter end portion at the extreme end thereof as shown in FIG. 5 is obtained.

Third Embodiment

FIGS. 6 to 9 illustrate a third embodiment which is capable of precisely restraining the location where a tapered surface portion TP is to be formed. This embodiment is characterized in providing the coating film-removed section with a liquid level controlling means 40 for defining the level of the etchant J. In the embodiment shown in FIG. 6, the liquid level controlling means 40 is constituted by a residual coating film.

Specifically in this embodiment, assuming that the residual coating film 11C-1 shown in FIG. 3 is referred to as a first residual coating film.

Figure 6:
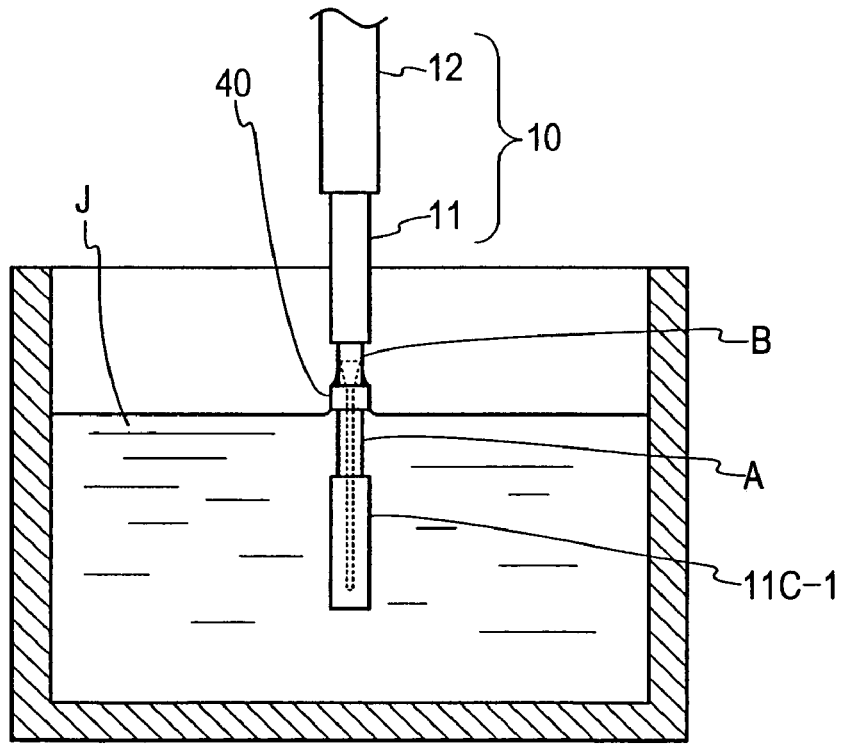
FIG. 6 is a cross-sectional view illustrating a third embodiment of the optical fiber end processing method according to this invention.

This embodiment is characterized in that a second residual coating film 11C-2 having a length M' is disposed in a midst of the coating film-removed section A so as to divide it into lower portion A which is called as a first coating film-removed section and upper portion B called as a second coating film-removed section as shown in FIG. 6.

The second residual coating film 11C-2 constitutes a liquid level controlling means 40.

The etching is initiated with the lower end of the liquid level controlling means 40 contacted by the liquid surface of the etchant J. (see FIG. 9)

It is required that the liquid level controlling means 40 should at least surround the peripheral surface of the optical fiber element 11 and should have a flange-like portion protruding even slightly beyond the surface of the clad layer 11B. The amount that the etchant J rises up due to the surface tension is thus restricted by this protruding portion.

When the etching is initiated in this condition, that portion of the optical fiber element 11 immersed in the etchant J is etched to become thinner to form a reduced-diameter portion 14, and simultaneously the etching proceeds upwardly into an interface space between the second residual coating film 11C-2 constituting the liquid level controlling means 40 and the surface of the clad layer until the etching reaches the upper end of the liquid level controlling means. It should be noted that there is a slight amount of time lag or time delay for the reach of the etching from the lower end to the upper end of the liquid level controlling means. Due to this time lag, the amount of the etching in radial direction to thin the clad at the lower end of the liquid level controlling means is slightly larger than that at the upper end, so that the clad has a second tapered surface portion TP'.

Once the etching has reached the upper end of the liquid level controlling means 40, the etchant J is further drawn upwardly through an annular gap defined between the liquid level controlling means 40 and the clad layer to continue with the etching. Thereafter, the etchant J is still further drawn upwardly along outer periphery of the clad exposed in the second coating film-removed section B due to the surface tension from the upper end to a certain height M.

It is thus to be appreciated that a tapered surface portion TP of axial length M is formed on the clad layer at the second coating film-removed section B upward from the upper end of the liquid level controlling means 40 by the etchant J as sucked up through the gap between the liquid level controlling means 40 and the outer periphery of the clad layer. It is further noted that the degree of slant of the second tapered surface portion TP' is relatively small in comparison to that of the first tapered surface portion TP, so that the second tapered surface portion can be considered as a part of the reduced-diameter portion 14.

The location or the lower end of the tapered surface portion TP can be arbitrarily determined by selecting the axial dimension of the liquid level controlling means 40 (although limited to within the range of height of the etchant sucked up by capillary action). The axial dimension M of the tapered surface portion TP is determined by the height of the etchant rising up above the upper end of the controlling means 40, which is in turn determined by the surface tension of the etchant J. In view of these conditions, the upper end of the liquid level controlling means 40 is seemed to correspond approximately to the level of the etchant J for forming the tapered surface portion TP. Hence, the upper end of the tapered surface portion TP is defined at a certain distance M (see FIGS. 7 and 9) from the upper end of the liquid level controlling means 40.

Figure 7:
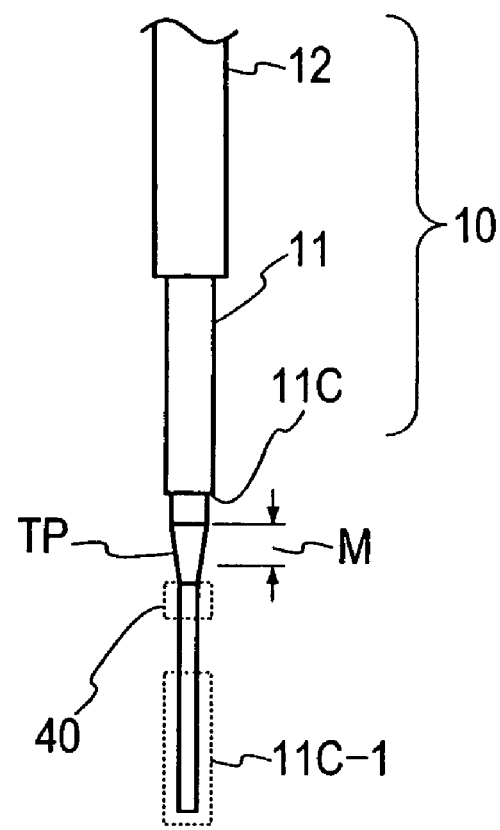
FIG. 7 is a side view illustrating the configuration of the optical fiber element obtained by the method shown in FIG. 6.
Figure 8:
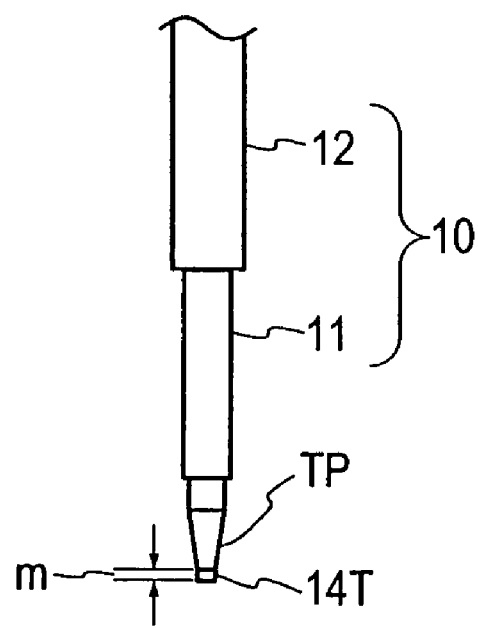
FIG. 8 is a side view illustrating the optical fiber element shown in FIG. 7 after the reduced-diameter portion has been removed.
Figure 9:
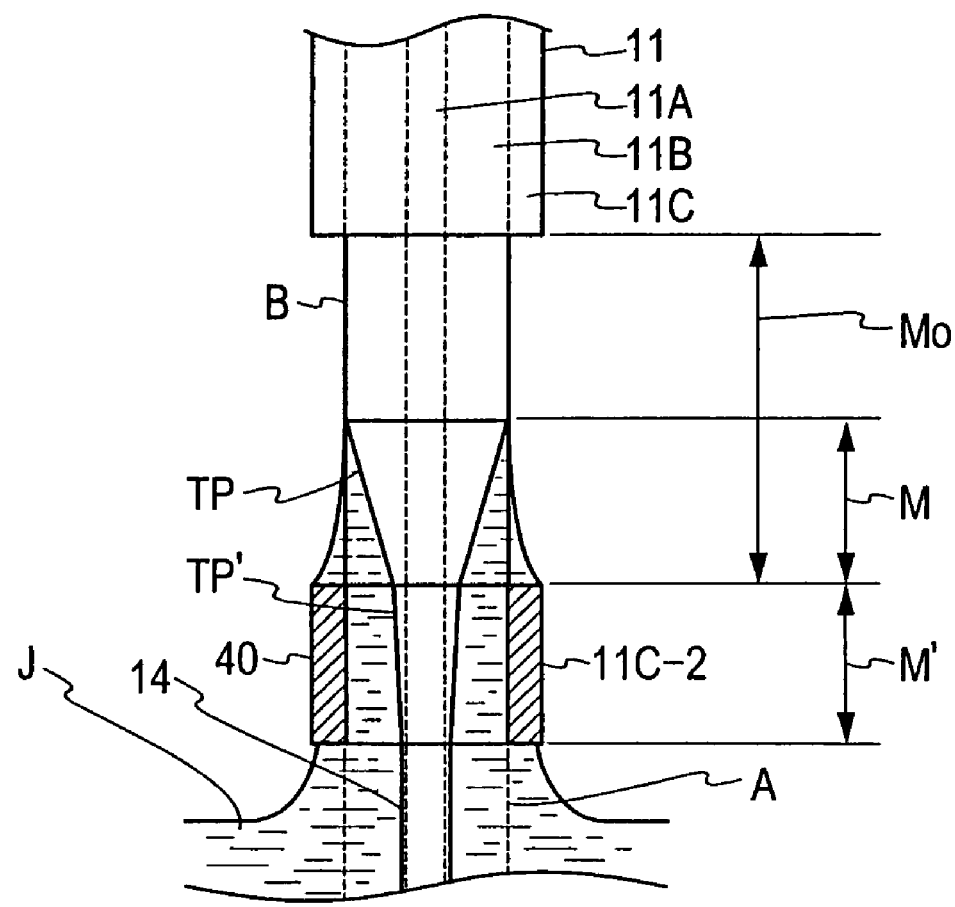
FIG. 9 is an enlarged, cross-sectional view illustrating the principal parts of the optical fiber end portion processing method shown in FIG. 6.

It is to be noted that FIG. 8 illustrates the optical fiber element with the reduced-diameter end portion 14T which is obtained from the optical fiber element of FIG. 7 by removing the reduced-diameter portion 14 therefrom. It is thus to be appreciated that this embodiment is applicable to an instance in which the location where the tapered surface portion is to be formed is preliminarily determined.

In this embodiment, the liquid level controlling means 40 which is composed of the second coating film-removed section B is observed to be separated from the outer periphery of the clad layer when the etching has reached to the upper end of the liquid level controlling means and to float on the etchant surface by means of the surface tension of the etchant. This fact is quite significant and has never been know from any prior art. Accordingly, there is no need to employ any support means for supporting or holding the liquid level controlling means in its proper position.

Notwithstanding, however, it may be possible to employ any suitable supporting means, so that such embodiments using the supporting means are also involved within this invention.

Fourth Embodiment

Figure 10:
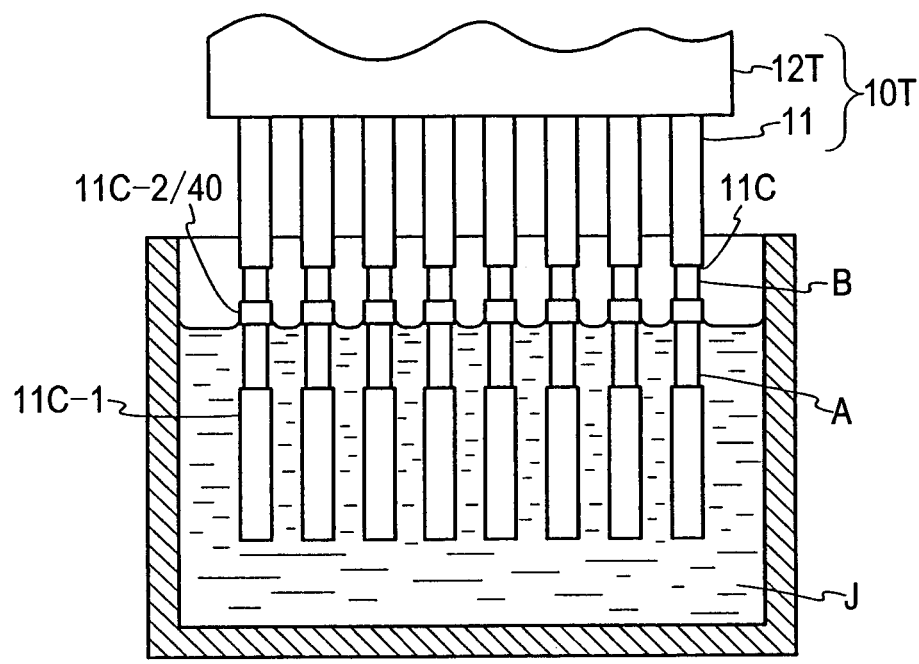
FIG. 10 is a cross-sectional view illustrating a fourth embodiment of the optical fiber end processing method according to this invention.
Figure 27:
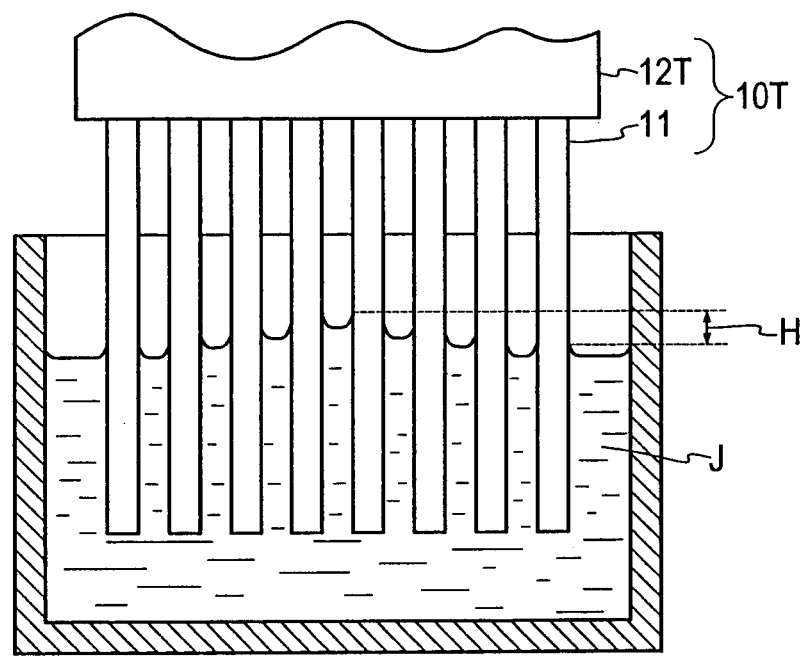
FIG. 27 is a cross-sectional view illustrating an etching process carried on the tape-type optical fiber array to form a tapered surface portion thereon, which is conducted by the present inventors.
Figure 28:
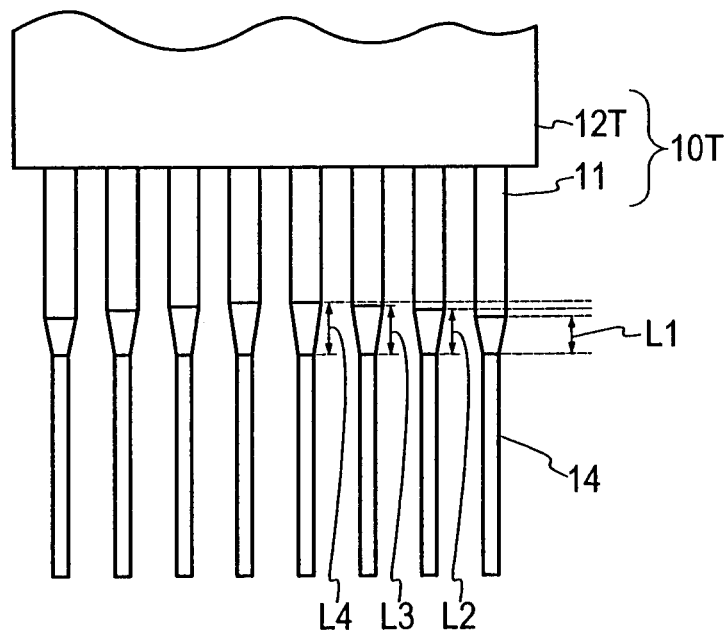
FIG. 28 is a side view illustrating the configuration of the optical fiber elements of the tape-type optical fiber array comprising a plurality of optical fibers gathered together in the form of a tape, as obtained by the etching process shown in FIG. 27.

FIG. 10 illustrates another form of the liquid level controlling means 40 shown in FIG. 6. As noted hereinbefore, if an attempt is made to form tapered surface portions on the individual fiber elements 11 of a tape type optical fiber array 10T comprising a plurality of optical fiber elements 11 held by a sport 12T with a fine array pitch therebetween (spacings of 0.25 mm, for example), there would occur undesirable displacement in axial positions of the tapered surface portions formed as well as the problem that the axial dimension L of the tapered surface portion will be several times the length of the corresponding tapered surface portion formed on the single-core fiber, due to the surface tension acting on the individual fiber elements 11 overlapping each other as explained with reference to FIGS. 27 and 28. The embodiment of FIG. 10 is directed to an optical fiber end processing method capable of resolving such problems.

In this embodiment as well, each of the optical fiber elements 11 exposed from the sport 12T is provided with a first coating film-removed section A and a second coating film-removed section B, and a liquid level controlling means 40 formed by a second residual coating film 11C-2 between the first coating film-removed section A and the second coating film-removed section B. The liquid level controlling means 40 should be formed so as to be uniform in position and axial dimension for all of the optical fiber elements. To this end, apparatus such as laser beam irradiation apparatus capable of removing a coating film by aiming a laser beam accurately at a predetermined position may preferably be utilized to form the first coating film-removed section A and the second coating film-removed section B.

The end portions of the optical fiber element 11 with the first coating film-removed sections A and the second coating film-removed sections B formed thereon are then dipped into an etchant J while holding the elements in an attitude perpendicular to the liquid surface of the etchant J. In doing so, the lower ends of the liquid level controlling means 40 are brought into contact with the liquid surface of the etchant J to limit the rising amount of the etchant J. This limitation of the rising amount of the etchant J, restrains the heights of the etchant J rising due to surface tension from the upper ends of the respective liquid level controlling means 40 and hence to a constant height, irrespective of the position of the individual optical fiber elements 11 in the array.

Figure 11:
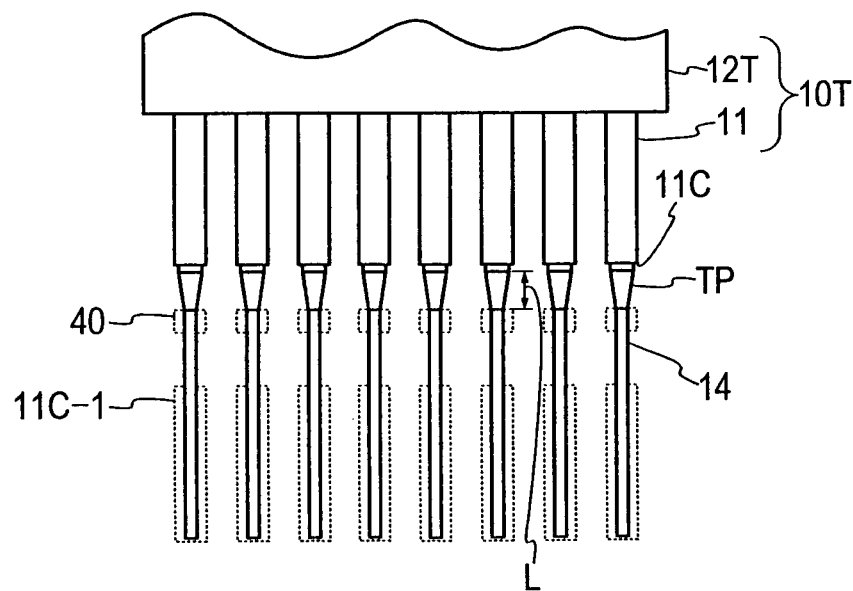
FIG. 11 is a side view illustrating the configuration of the optical fiber element obtained by the method shown in FIG. 10.

It will be thus understood that the locations of the tapered surface portion TP formed by etching are horizontally aligned at a constant height as shown in FIG. 11. The axial dimensions L of the tapered surface portions TP are also unified throughout the array. In addition, it is possible to make the length of the tapered surface portions TP approximately equal to that of the corresponding tapered surface portion formed on a single-core fiber, since the mutual overlapping of the surface tensions between the individual fiber elements 11 is eliminated and the axial dimensions L of the tapered surface portions TP are determined by the height M (see FIG. 9) of the etchant J rising from the top of the liquid level controlling means 40.

Accordingly, for even a multiple-core type optical fiber array, the adoption of the processing method described in this embodiment allows for reducing the length of the tapered surface portions formed at the forward end thereof, whereby a multiple-core type optical fiber array 10T provided with highly durable tapered surface portions may be obtained. It is to be noted that in FIG. 11, the original positions of the first residual coating films 11C-1 are shown in phantom lines since they have already been dropped into the liquid after when the reduced-diameter portions 14 were formed.

As described before, the second residual coating films are floated on the liquid surface of the etchant. They may be, however, supported by any other supporting means (not shown).

Fifth Embodiment

Figure 12:
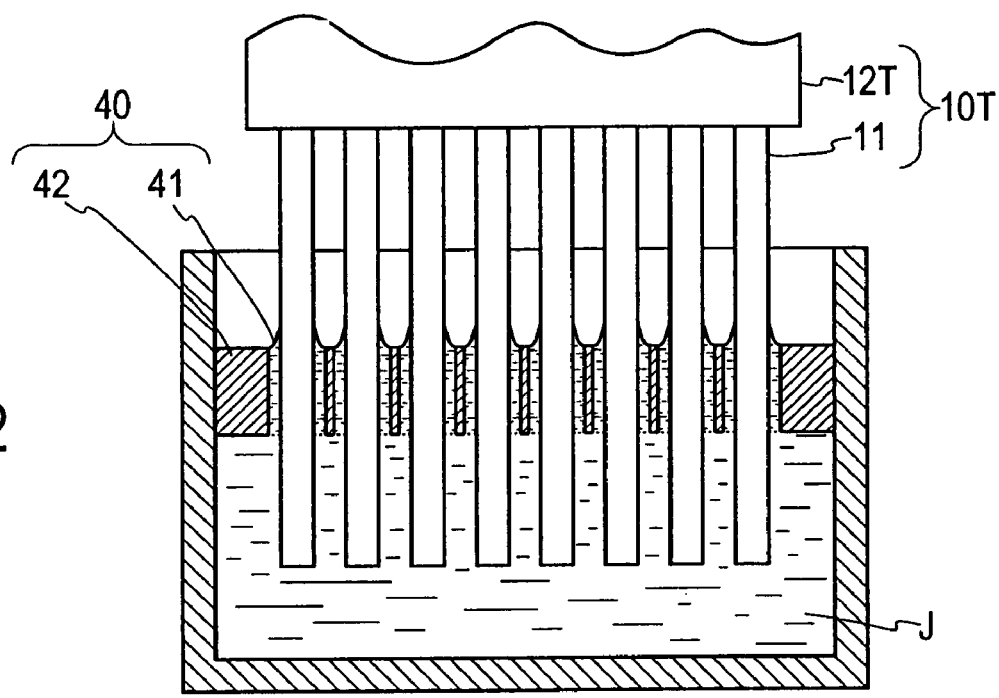
FIG. 12 is a cross-sectional view of an etching apparatus including a cross-section taken on line 12-12 of the liquid level controlling means shown in FIG. 13, for illustrating a fifth embodiment of the optical fiber end processing method according to this invention.
Figure 13:
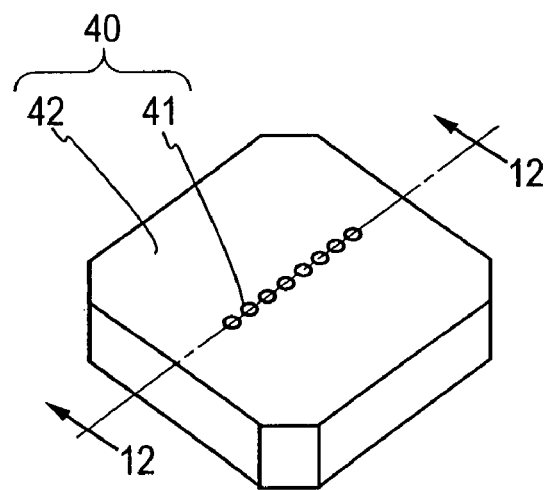
FIG. 13 is a perspective view illustrating the construction of the liquid level controlling means used in the embodiment of FIG. 12.

FIGS. 12 and 13 illustrate a fifth embodiment utilizing another form of the liquid level controlling means 40. In this embodiment, the liquid level controlling means 40 comprises a flat plate 42 having small apertures 41 formed therethrough, each having a diameter slightly larger than the diameter of the corresponding optical fiber element.

The flat plate 42 may be made of a material such as acrylic resin having resistance properties to the etchant J. It is required that the small apertures 41 have to have a diameter slightly larger than the outer diameter of the optical fiber element 11 such that the etchant J may be drawn up by capillary action through the gaps defined by the inner peripheral walls of the apertures 41 and the outer peripheries of the corresponding optical fiber elements 11.

Figure 14:
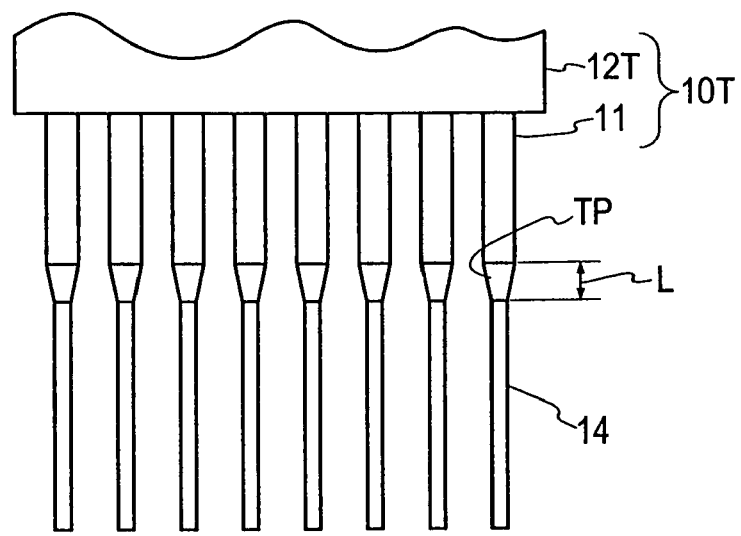
FIG. 14 is a side view illustrating the configuration of the optical fiber element obtained by the method shown in FIG. 12.

The liquid level controlling means 40 thus composed by the flat plate 42 with the small apertures 41 may likewise eliminate the overlapping of surface tensions acting on each other even if a plurality of optical fiber elements 11 are arrayed with a fine pitch. Consequently, the locations of the individual optical fiber elements 11 are made uniform as shown in FIG. 14, as they are determined by the elevation of the upper end of the liquid level controlling means 40. The axial dimensions L of the tapered surface portions TP are also made constant throughout the array, since they are determined by the height M of the etchant J rising around the individual optical fiber elements 11. And yet, it is possible to hold the length of the tapered surface portions TP down to approximately 0.1 mm which is comparable to that of the corresponding tapered surface portion formed on a single-core fiber, hence to provide highly strong tapered surface portions TP.

While in FIG. 14 the optical fiber elements 11 are illustrated as having the reduced-diameter portions 14 remaining, actually the reduced-diameter portions 14 are removed with only the reduced-diameter end portion 14T left below the tapered surface portion TP as shown in FIGS. 5 and 8.

Figure 15:
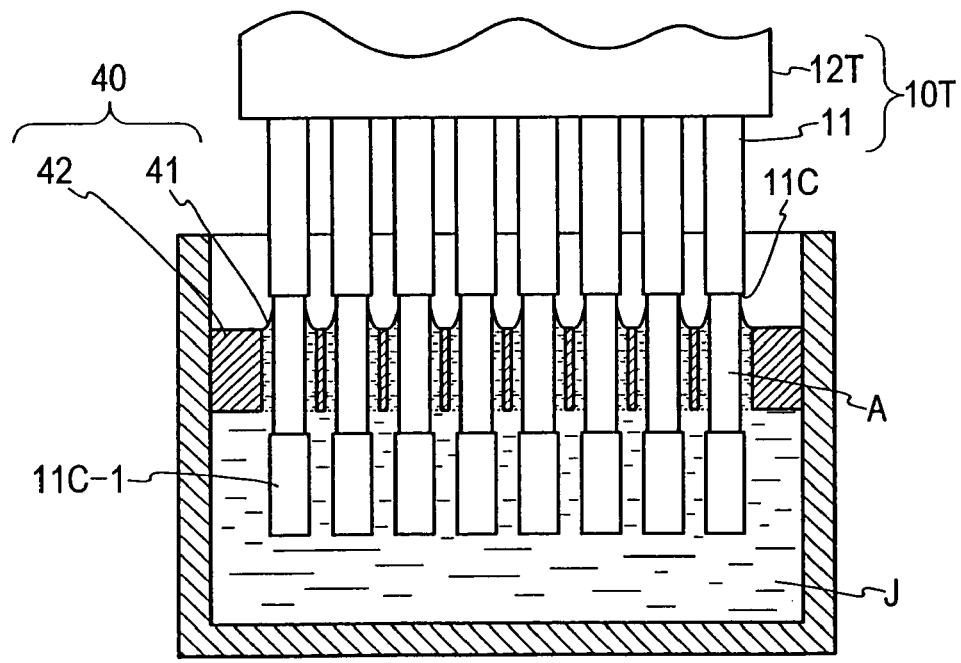
FIG. 15 is a cross-sectional view of an etching apparatus for illustrating a modified example of the processing method shown in FIG. 12.

Further, this embodiment, which utilizes a flat plate 42 having small apertures 41 formed therethrough as a liquid level controlling means 40, need not necessarily require that the optical fiber element 11 have a coating film 11C. However, such liquid level controlling means 40 constituted by a flat plate 42 may equally applied to an optical fiber element having a coating film 11C for covering the clad layer as shown in FIG. 15. In such case, there need only be a single coating film-removed section A.

Sixth Embodiment

Figure 16:
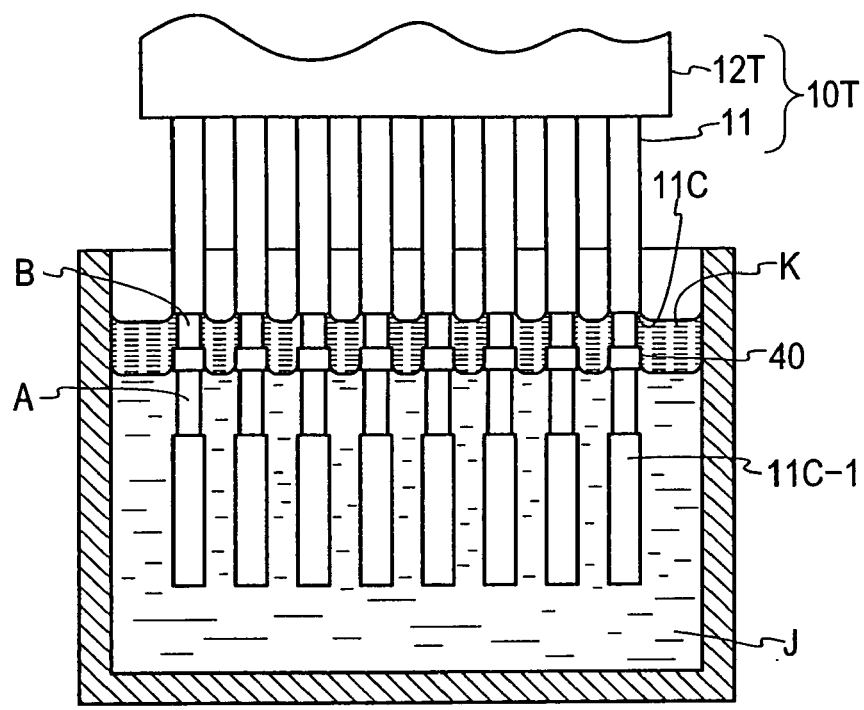
FIG. 16 is a cross-sectional view of an etching process for illustrating a sixth embodiment of the processing method shown in FIG. 10.
Figure 17:
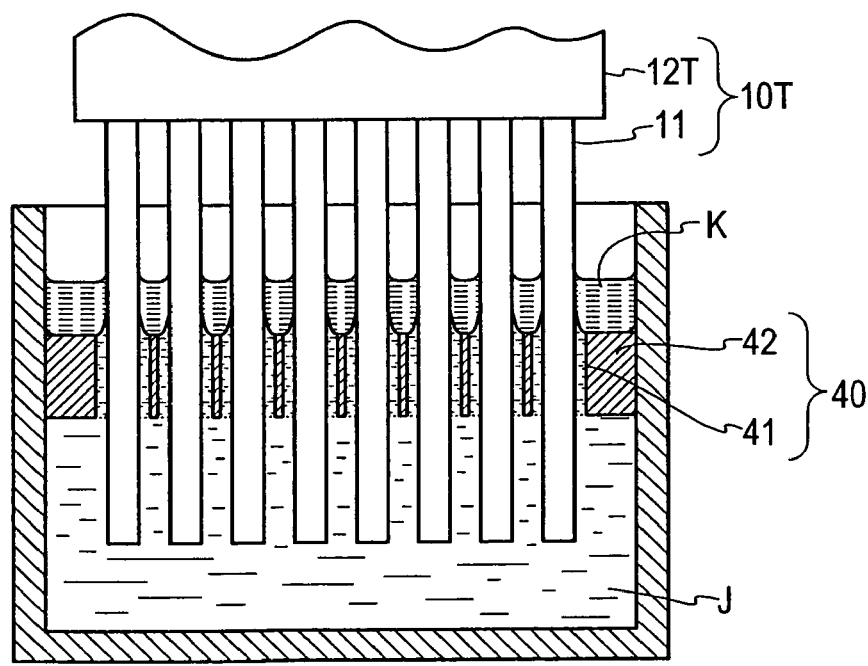
FIG. 17 is a cross-sectional view of an etching process for illustrating a modified example of the processing method shown in FIG. 12.

FIGS. 16 and 17 illustrates modified example of the embodiments shown in FIGS. 10 and 12. In the embodiment of FIGS. 16 and 17, a liquid K having a specific gravity lower than that of the etchant J is incorporated in the etchant J such that the lighter liquid K floats on the liquid surface of the etchant J. In the case that the etchant J is hydrogen fluoride, oil may be used as the liquid K. The lighter liquid K floating on the liquid surface of the etchant J serves to prevent the etchant J which is climbing up the peripheral surface of the optical fiber element 11 due to surface tension from being deformed in shape by vibrations, for example.

More specifically, if vibrations were applied to the etchant J which is adhering and mantling up along the outer peripheral surface of the optical fiber element 11 due to surface tension as in the embodiments shown in FIGS. 10 and 12, the etchant J thus attached to the peripheral surface of the optical fiber element 11 may possibly be deformed in shape. If the shape of the attached etchant J is deformed, the configuration of the resulting tapered surface portion TP is also deformed, so that it leads to the disadvantage of reducing the manufacturing yield. With a view to overcoming this drawback, the liquid K having a specific gravity lower than that of the etchant J is incorporated so as to float on the etchant J, whereby the shape into which the etchant J mantles up is prevented from being distorted by vibrations, wind pressure or the like. This introduces the advantage of improving the production yield.

Seventh Embodiment

Figure 18:
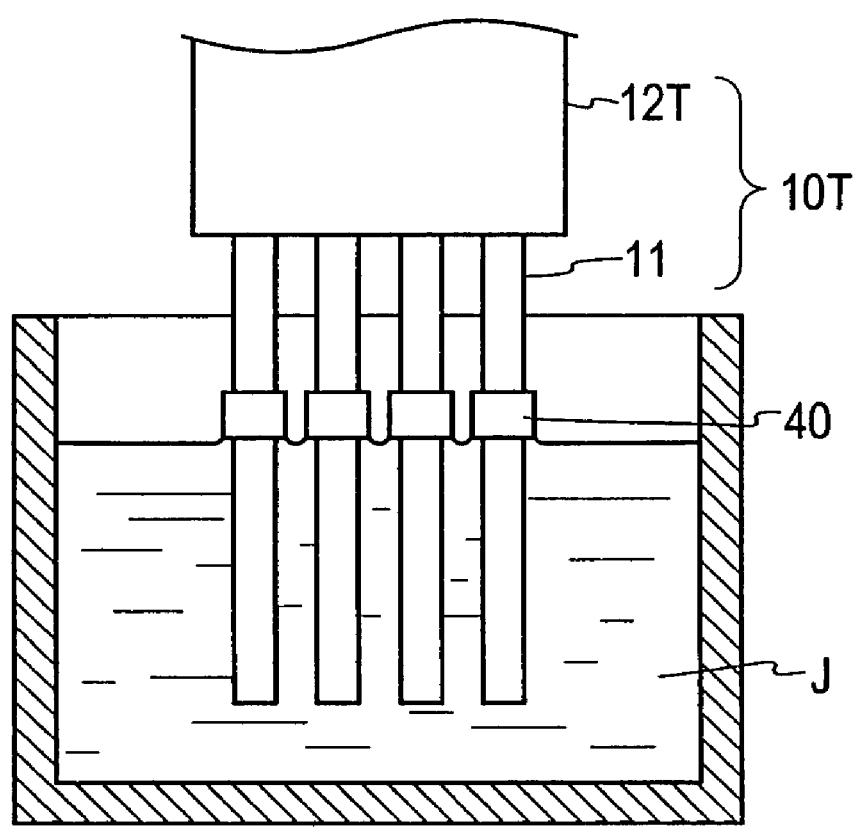
FIG. 18 is a cross-sectional view illustrating a seventh embodiment of the optical fiber end processing method according to this invention.
Figure 19:
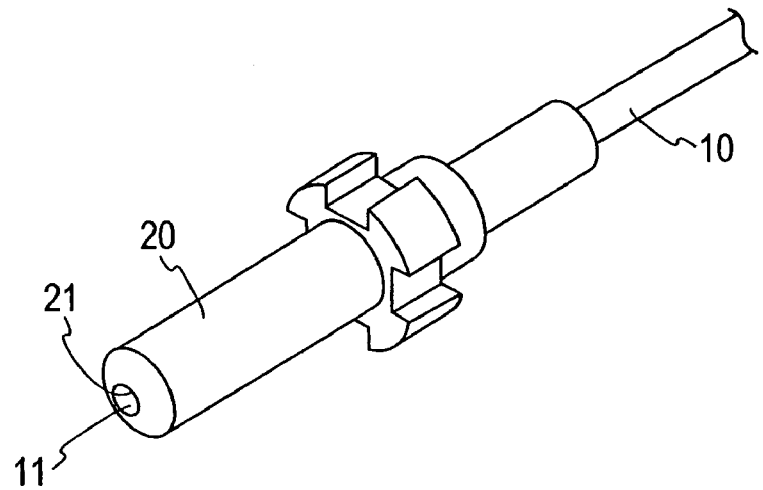
FIG. 19 is a perspective view for illustrating a prior art.
Figure 20:
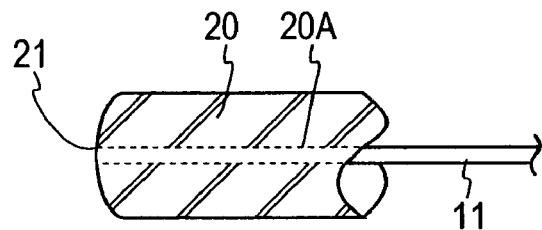
FIG. 20 is a cross-sectional view illustrating the details of the ferrule shown in FIG. 19.
Figure 21:
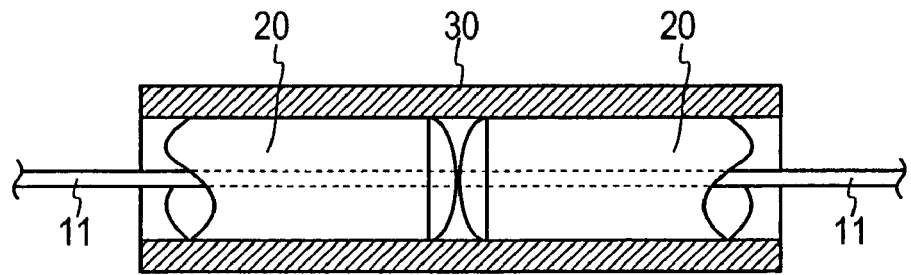
FIG. 21 is a cross-sectional view illustrating two of the ferrule shown in FIG. 19 being joined together.
Figure 22:
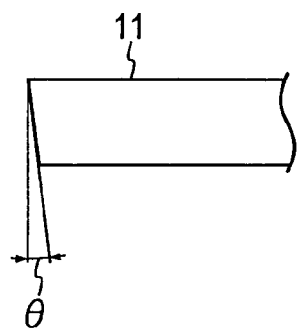
FIGS. 22A-22C are structures illustrating the drawbacks of the prior art shown in FIGS. 19-21.
Figure 22:
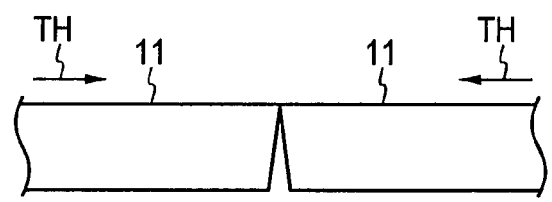
Figure 22:
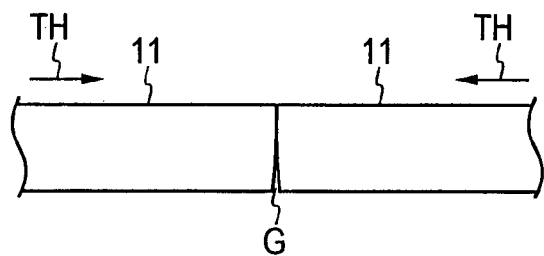

FIG. 18 illustrates yet another embodiment of this invention. In this embodiment, an etching-resistant film is deposited on an optical fiber element 11 devoid of coating film 11C so that the etching-resistant film constitutes a liquid level controlling means 40.

Effects

As discussed above, according to this invention, the processing method involves forming a tapered surface portion TP on a optical fiber element 11 adjacent to its reduced-diameter portion 14 and subsequently cutting the reduced-diameter portion 14 in such a manner to leave a reduced-diameter end portion 14T. It provides therefore lowering the incidence of flaws such as cracks occurring on the cut faces, and leading to the enhancement of the manufacturing yield in this respect.

According to another aspect of this invention for application to an optical fiber element 11 having a coating film 11C covering a clad layer, the processing method involves providing a coating film-removed section A on the fiber element with a residual coating film 11C left toward the forward end thereof and then initiating the etching while the coating film-removed section A is held in contact with the liquid surface of the etchant, whereby a desired tapered surface portion TP can be formed without the need for depositing a resist film 13 (see FIG. 24) for preventing the core from being exposed to the etchant over the forward end of the optical fiber element 11. As a result, this invention provides the advantage that a tapered surface portion TP with a reduced-diameter portion 14 can be formed by a simple method even on a highly durable optical fiber element reinforced by a coating film 11C.

In addition, this invention provides a processing method characterized by a liquid level controlling means 40. The provision of this liquid level controlling means 40 makes it possible to determine the point where the formation of the tapered surface portion TP is to be initiated. Consequently, this method is well suitable to instances in which the location where tapered surface portions are to be formed is predetermined.

Moreover, when applied to even an optical fiber array constituted by a plurality of optical fiber elements 11 held together by a support 12T with a fine array pitch, this method utilizing the liquid level controlling means 40 can avoid the phenomenon that the length of the tapered surface portion formed may be elongated depending on the position of the corresponding optical fiber element 11 in the array due to the surface tensions acting on the individual fiber elements 11 overlapping each other. It will thus be appreciated that for even a multiple-core type optical fiber array 10T, the invention provides the advantage of forming each of the individual optical fiber elements with a highly durable tapered surface portion. This advantage is extremely great in practical use. In addition, when a plurality of single-core optical fiber elements 11 are to be formed simultaneously, the provision of the liquid level controlling means 40 introduces the advantage of eliminating the mutual overlapping of the surface tensions between the individual fiber elements 11.

What is claimed is:

1. A method for processing an end portion of an optical fiber element having a center core in the axial center thereof, a cylindrical clad surrounding said core and an outer cover coating film surrounding said clad, comprising the steps of:
removing said coating film in a partial cylindrical portion thereof having a specified length so as to form a coating film-removed section and a residual coating film section at one end portion of said optical fiber element;
dipping a first part of said coating film-removed section and whole part of said residual coating film section disposed at said one end portion of said optical fiber element into an etchant capable of etching materials of said core and clad of said fiber element perpendicularly to level surface of said etchant in such a manner that a remaining second part of said coating film-removed section is extending upwardly from the level surface of said etchant to thereby initiate etching process;
causing such a portion of the clad as exposed at the first part of the coating film-removed section of said fiber element and immersed in said etchant to be etched into a coaxial reduced-diameter portion while causing such a portion of the clad as exposed at the second part of the coating film-removed section and attached thereto with said etchant which rises to a certain height above said level surface due to surface tension of the etchant to be etched into a conical tapered surface portion which is formed between the reduced-diameter portion and un-etched portion of said fiber element;

terminating the etching once said reduced-diameter portion reaches a certain diameter that is close to but larger than the diameter of the center core; and cutting said reduced-diameter portion at a point spaced by a distance which does not exceed the diameter of the reduced-diameter portion from the boundary between said tapered surface portion and said reduced-diameter portion toward the reduced-diameter portion so as to leave a reduced-diameter end portion continuously joining said tapered surface portion.

2. The method according to claim 1, wherein a plurality of said optical fiber elements held in parallel to each other by a single common covering member to thereby form an optical fiber array, are subjected to processing.

3. The method according to claim 1, wherein said distance is one of:
(1) 20-30 μm,
(2) 40-60% of the diameter of the core or
(3) 16-24% of the diameter of the optical fiber element.

4. The method according to claim 1, wherein a liquid having a specific gravity lower than that of said etchant is mixed into said etchant.

5. The method according to claim 4, wherein a plurality of said optical fiber elements held in parallel to each other by a single common covering member to thereby form an optical fiber array, are subjected to processing.

6. The method according to claim 1, which further comprises a step of providing, before the dipping step, a level controlling means for restraining the level surface of said etchant to said optical fiber element at a position where said optical fiber element contacts the level surface of said etchant whereby the axial dimension of said tapered surface portion to be formed on said optical fiber element is set at a predetermined value.

7. The method according to claim 6 wherein, said level controlling means is constituted by an etching-resistant film formed around the peripheral surface of said optical fiber element.

8. The method according to claim 6, wherein a plurality of said optical fiber elements held in parallel to each other by a single common covering member to thereby form an optical fiber array, are subjected to processing.

9. The method according to claim 6, wherein a liquid having a specific gravity lower than that of said etchant is mixed into said etchant.

10. The method according to claim 9, wherein a plurality of said optical fiber elements held in parallel to each other by a single common covering member to thereby form an optical fiber array, are subjected to processing.

11. The method according to claim 6 wherein, said level controlling means is constituted by a coating film applied to said optical fiber element.

12. The method according to claim 11, wherein a plurality of said optical fiber elements held in parallel to each other by a single common covering member to thereby form an optical fiber array, are subjected to processing.

13. The method according to claim 11, wherein a liquid having a specific gravity lower than that of said etchant is mixed into said etchant.

14. The method according to claim 13, wherein a plurality of said optical fiber elements held in parallel to each other by a single common covering member to thereby form an optical fiber array, are subjected to processing.

15. The method according to claim 6 wherein, said level controlling means comprises a flat plate made of etching-resistant material and through-apertures formed through said flat plate perpendicularly to the plane of the flat plate, each of said through-apertures having a diameter slightly larger than the outer diameter of the corresponding optical fiber element.

16. The method according to claim 15, wherein a plurality of said optical fiber elements held in parallel to each other by a single common covering member to thereby form an optical fiber array, are subjected to processing.

17. The method according to claim 15, wherein a liquid having a specific gravity lower than that of said etchant is mixed into said etchant.

18. The method according to claim 17, wherein a plurality of said optical fiber elements held in parallel to each other by a single common covering member to thereby form an optical fiber array, are subjected to processing.

19. A method for processing an end portion of an optical fiber element having a center core and an outer clad surrounding said core, comprising the steps of:

providing, a level controlling means for restraining a level surface of an etchant to said optical fiber element at a position where said optical fiber element contacts the level surface of said etchant;

dipping one end portion of said optical fiber element into an etchant capable of etching the fiber element perpendicularly to level surface of said etchant so that said level controlling means contacts at one end thereof to the level surface of said etchant;

causing the outer clad of said one end portion of said fiber element immersed in said etchant to be etched into a substantially coaxial reduced-diameter portion while causing the outer clad of such a portion of said fiber element that is extended upwardly to a certain height from the level controlling means and that is attached with the etchant which rises upwardly from the level controlling means due to surface tension of the etchant to be etched into a conical tapered surface portion which is formed between the reduced-diameter portion and un-etched portion of said fiber element whereby the axial dimension of said tapered surface portion to be formed on said optical fiber element is set at a predetermined value;

terminating the etching once said reduced-diameter portion reaches a certain diameter that is close to but larger than the diameter of the center core; and cutting said reduced-diameter portion at a point spaced by a distance which does not exceed the diameter of the reduced-diameter portion from the boundary between said tapered surface portion and said reduced-diameter portion toward the reduced-diameter portion so as to leave a reduced-diameter end portion continuously joining said tapered surface portion.

20. The method according to claim 19, wherein a plurality of said optical fiber elements held in parallel to each other by a single common covering member to thereby form an optical fiber array, are subjected to processing.

21. The method according to claim 19, wherein a liquid having a specific gravity lower than that of said etchant is mixed into said etchant.

22. The method according to claim 21, wherein a plurality of said optical fiber elements held in parallel to each other by a single common covering member to thereby form an optical fiber array, are subjected to processing.

23. The method according to claim 19 wherein, said level controlling means is constituted by an etching-resistant film formed around the peripheral surface of said optical fiber element.

24. The method according to claim 23, wherein a plurality of said optical fiber elements held in parallel to each other by a single common covering member to thereby form an optical fiber array, are subjected to processing.

25. The method according to claim 23, wherein a liquid having a specific gravity lower than that of said etchant is mixed into said etchant.

26. The method according to claim 25, wherein a plurality of said optical fiber elements held in parallel to each other by a single common covering member to thereby form an optical fiber array, are subjected to processing.

27. The method according to claim 19 wherein, said level controlling means is constituted by a coating film applied to said optical fiber element.

28. The method according to claim 27, wherein a plurality of said optical fiber elements held in parallel to each other by a single common covering member to thereby form an optical fiber array, are subjected to processing.

29. The method according to claim 27, wherein a liquid having a specific gravity lower than that of said etchant is mixed into said etchant.

30. The method according to claim 29, wherein a plurality of said optical fiber elements held in parallel to each other by a single common covering member to thereby form an optical fiber array, are subjected to processing.

31. The method according to claim 19 wherein, said level controlling means comprises a flat plate made of etching-resistant material and through-apertures formed through said flat plate perpendicularly to the plane of the flat plate, each of said through-apertures having a diameter slightly larger than the outer diameter of the corresponding optical fiber element.

32. The method according to claim 31, wherein a plurality of said optical fiber elements held in parallel to each other by a single common covering member to thereby form an optical fiber array, are subjected to processing.

33. The method according to claim 31, wherein a liquid having a specific gravity lower than that of said etchant is mixed into said etchant.

34. The method according to claim 33, wherein a plurality of said optical fiber elements held in parallel to each other by a single common covering member to thereby form an optical fiber array, are subjected to processing.

* * * * *